United States Patent
Kemmer et al.

(10) Patent No.: US 6,227,751 B1
(45) Date of Patent: May 8, 2001

(54) MOUNT FOR PLATE-SHAPED COMPONENTS

(75) Inventors: Wolfgang Kemmer, Würzburg; Wolfgang Stühler, Schwanfeld, both of (DE)

(73) Assignee: Mero Systeme GmbH & Co. KG, Max-Mengeringhausen (DE)

( * ) Notice: Subject to any disclaimer, the term of this patent is extended or adjusted under 35 U.S.C. 154(b) by 0 days.

(21) Appl. No.: 09/189,531

(22) Filed: Nov. 10, 1998

(30) Foreign Application Priority Data

Nov. 11, 1997 (DE) .................................. 197 49 634

(51) Int. Cl.[7] ..................................... F16C 11/00
(52) U.S. Cl. ............................. 403/144; 403/143
(58) Field of Search .................... 403/144, 143, 403/137, 138, 141, 146, 129

(56) References Cited

U.S. PATENT DOCUMENTS

| | | | |
|---|---|---|---|
| 2,657,945 | * 11/1953 | Britt | 403/144 |
| 2,811,377 | * 10/1957 | Latzen | 403/137 |

FOREIGN PATENT DOCUMENTS

| | | | |
|---|---|---|---|
| 17278 | * 4/1934 | (AU) | 403/138 |
| 1 109 464 | 1/1962 | (DE) . | |
| 1 299 179 | 5/1974 | (DE) . | |
| 195 23 674 A1 | 1/1997 | (DE) . | |
| 0 655 543 B1 | 7/1997 | (EP) . | |
| 539196 | * 8/1955 | (IT) | 403/138 |

* cited by examiner

Primary Examiner—Lynne H. Browne
Assistant Examiner—John R. Cottingham
(74) Attorney, Agent, or Firm—McGlew and Tuttle, P.C.

(57) ABSTRACT

A mount for plate-shaped components, more particularly glass plates is disclosed. The mount comprises a socket element, which penetrates a recess in the plate-shaped component, thereby fixing the component, and a hinged bolt. At its first end, the hinged bolt comprises ball element, which is rotatably mounted in a recess of the socket element, and can be secured with its opposite second end to a support structure, thereby fixing the socket element. In this respect, the ball element (6) is at least slightly linearly displaceable in the recess (7) of the socket element (2) along tile longitudinal axis of the hinged bolt (3), and at least one spring element (12, 13) acts indirectly or directly upon the ball element (6).

18 Claims, 6 Drawing Sheets

MOUNT FOR PLATE-SHAPED COMPONENTS

FIELD OF THE INVENTION

The invention relates to a mount for plate-shaped components and more particularly glass plates, with a socket element, which penetrates a recess in the plate-shaped component, thereby fixing the component, and a hinged bolt, which at its first end comprises a ball element, which is rotatably mounted in a recess of the socket element, and with its opposite second end can be secured to a support structure, thereby fixing the socket element.

Mounts of this type can be secured by way of a socket element to plate-shaped components and by way of a hinged bolt to a support structure. In this respect, the hinged bolt is rotatably mounted in the socket element by means of a ball element and can be pivoted to a limited degree in all directions. Consequently, the securing point of the plate-shaped component has a degree of freedom of movement relative to the rigid support structure.

The mount according to the invention can basically be used in any desired manner for all types of plate-shaped components, for example wooden boards, light metal plates, plastic material plates or the like, whether these are single layer or multi-layer plate elements in the form of sandwich structures, in particular where the aim is to mount the plate-shaped components in a manner which is substantially free of bending moments. However, the field of application is preferably with glass plates, in particular in the construction industry, which as a result of their structure are particularly prone to breakage when bending moments occur.

BACKGROUND OF THE INVENTION

Usually, the mounts are arranged at the corner points of the plate-shaped components. If a surface load, for example caused by a wind flow, acts upon the plate-shaped components once they are fitted, then the plate is elastically buckled by the surface load and the securing points at the corners of the plate pivot about the center of rotation of the hinged journal. Since the securing points are therefore freely pivotable in mounts of this type, it is possible for the plate to freely elastically deform. This deformation is not prevented at the securing points, which would generate high bending moments. The tensile and compressive stresses acting within the plate material can therefore be reduced as compared with a rigid securing in known manner.

In many applications of this type of mount, in particular in the formation of building facades, it is necessary to secure plate-shaped components having increasingly large surface areas. With the increase in the surface area of the plate-shaped components, there is a considerable increase in the loading of the mounts at the individual securing points as a result of the increasing intrinsic weight and the increasing surface area which can be acted upon by wind flows. If the loading of the mounts at the individual securing points is to be kept within certain limits, then it is necessary to increase the number of securing points to correspond to the increase in the surface area of the plate-shaped components. Thus, in order to secure plate shaped components having a large surface area, it is no longer sufficient to provide securing points solely in the corners of the plates. It is additionally necessary to arrange securing points on the periphery or in the internal region of the plates.

A disadvantage of the mounts known according to the state of the art is that these only have one degree of freedom of movement. The hinged bolt can only be pivoted in the socket element. If a plate-shaped component is fixed using mounts of this type which are only pivotable in a plurality of securing points which are not all arranged in the corners of the plate-shaped component, then the plate- shaped component can no longer freely elastically buckle when acted upon by a surface load. Instead, a plurality of buckled areas form in the plate-shape-shaped component, which areas extend into one another at connecting lines between the different securing points. Consequently, this type of securing of plate-shaped components does not allow for a deformation of the components in the transition region between the various buckled regions. Since no deformation is possible in this area, peak stresses build up here, which can easily mean that the permissible strength values of the plate-shaped components are exceeded.

SUMMARY AND OBJECTS OF THE INVENTION

Proceeding from this state of the art, it is the primary object of the invention to provide a mount of the initially mentioned type, which has a second degree of freedom of movement in order to reduce or completely rule out the build up of peak stresses.

According to the invention, a mount for plate-shaped components is provided, more particularly glass plates, with a socket element, which penetrates a recess in the plate-shaped component, thereby fixing the component. A hinged bolt is rotatably mounted in a recess of the socket element. The hinged bolt has a first end which comprises a ball element. At its opposite second end the bolt can be secured to a support structure, thereby fixing the socket element. The ball element is at least slightly linearly displaceable in the recess of the socket element along the longitudinal axis of the hinged bolt, and at least one spring element acts indirectly or directly upon the ball element.

In the mount according to the invention, which in particularly suitable for glass plates, the ball element can be at least slightly linearly displaced in the socket element in which it is pivotably mounted along the longitudinal axis of the hinged bolt. Within the context of the present invention, the term "ball element" does not necessary signify an entire ball, but a component which has spherical partial surfaces at least in the region in which an intended hinged pivoting or rotation occurs. As a result of the fact that the ball element can be linearly displaced in the recess of the socket element, the hinged bolt is provided with an additional axis of freedom relative to the socket element. The hinged bolt can thus be pivoted to a limited degree and can also execute a linear movement along its longitudinal axis,. Furthermore, the mount according to the invention comprises at least one spring element, which acts indirectly or directly upon the ball element. As a result of this spring element, the ball element is elastically clamped in the recess of the socket element. Consequently, the hinged bolt has clearance-free contact with the socket element at all times, in spite of the additional linear axis of freedom of the ball element in the recess of the socket element.

If the plate-shaped component is deformed as a result of a surface load and as a result produces the various buckled regions, then the securing points of the plate can not only be pivoted in the mount, but also linearly displaced. As a result of the linear displacement of the securing points, the deformation of the plate-shaped components in the transition regions between the individual buckled regions is made possible, resulting in a smooth transition between the individual regions, which leads to a reduction in the peak stresses in these areas. If the mounts allow for sufficient linear displacement of the individual securing points, it can be attained that the plate-shape component no longer produces a plurality of buckled regions, but again only a single buckle in the event of surface loading. In this case, there is a uniform stress path in the plate material and peak stresses are avoided.

In order to attain the desired effect, it is sufficient in principle for a single spring element to act upon the ball element in the recess of the socket element. In this case, the ball element rests in the recess, which has a matching shape or function, rigidly against one side of the recess in the non-loaded state and is clamped in the recess on the opposite side of the ball element by the spring element. However, this type of design only allows for linear displacement of the ball element in the recess of the socket element in one direction along the longitudinal axis of the hinged bolt. Preferable to these one-way displaceable mounts is the action of two spring elements upon the ball element in the recess of the socket element on opposite sides of the ball element. In the non-loaded state, the ball element is clamped in the recess between the two oppositely acting spring elements. The linear displacement of the ball element in the recess of the socket element along the longitudinal axis of the hinged bolt can then occur in two directions. As a result of these two-way displaceable mounts, the peak stresses in the plate material under surface loading can be optimally reduced, since the securing points can he displaced not only in the direction of the surface load, but also, in particular in the peripheral region of the plate, in the direction opposite to the surface load. This allows for buckling of the plate-shaped component which is as uniform as possible.

The manner in which the hinged connection of the ball element in the recess of the socket element is realized is essentially unimportant. Thus, for example, the spring elements can only act indirectly via bearing plates which are arranged between the spring elements and the ball element and comprise spherical operating surfaces matching the spherical operating surfaces of the ball element in shape or function. However, it is preferable if the spring elements act directly upon the ball element and the operating surfaces required for producing the hinge function are formed in the regions of the spring elements which come to rest against the ball element.

As spring elements, it is possible to use all components which can elastically deform to the required degree upon the linear displacement of the ball element and at the same time provide sufficient elastic restoring forces to allow for clearance-free seating of the hinged journal in the recess of the socket element both in the loaded and nonloaded states of the mount. Conceivable are all types of spring elements such as rubber-elastic buffer elements, for example, or all types of metallic spring elements, such as cup springs or leaf springs, for example.

It is particularly cost-effective to construct the spring elements as helical springs, since the ends of helical springs can come to rest with their annular structure directly against the ball element and thus the hinged accommodation of the ball element in the recess of the socket element is substantially achieved without further auxiliary aids.

In respect of the geometrical design of the recess of the socket element for receiving the ball element, it is particularly advantageous if the recess comprises at least two rotationally symmetrical regions, whose axis of rotation extends substantially along the longitudinal axis of the hinged bolt. The first section is constructed in the form of a circular cylinder and can receive the ball element. This means that the diameter of the first section is at least slightly larger than the diameter of the ball element. During a linear displacement of the hinged bolt relative to the socket element, the ball element slides along the cylinder surfaces until the first end of the hinged bolt comes to rest against the base of the recess. The second section of the recess is constructed in the form of a frustum and can be penetrated by the hinged bolt. In this respect, the conical shape of the recess tapers towards the side of the end of the socket element facing away from the hinged bolt. As a result of the conical shape of the second region of the recess, a larger pivot range of the hinged bolt relative to the socket element can be obtained. If the hinged bolt is linearly displaced in the direction of the second end of the hinged bolt, then the ball element slides into the second region of the recess. In the radial plane in which the first region and the second region of the recess merge, the cylindrical surfaces of the first region and the conical curved surface of the second region have the same diameter and extend directly into one another. In the non-loaded state, the ball element should be arranged in the region of the transition from the first region of the recess into the second region of the recess.

A spring element should be arranged in each of the two rotationally symmetrical regions of the recess and should act indirectly or directly upon the ball element. As a result of this arrangement, it is attained that the ball element is held in a central position in the non-loaded state of the mount and, proceeding from this position, can be linearly displaced under loading both in the direction of the first end of the hinged bolt and in the direction of the second end of the hinged bolt. In this respect, the two spring elements should be fitted with a certain degree of prestressing in the mount, so that during a displacement of the ball element in the recess, one of the spring elements relaxes in each case and thus remains resting against the ball element in a clearance free manner at all times.

The elastic properties of the two spring elements, which are arranged on opposite sides of the ball element in the recess of the socket element, should preferably be adapted to one another in such a manner that, in the non-loaded state of the mount, the central point of the ball element comes to rest substantially in the radial plane in which the cylindrical and conical regions of the recess meet in the socket element. In this position, the ball element has a minimum radial clearance, since the largest radial diameter of the ball element is still in the first cylindrical region of the recess and on the other hand the optimal pivot range of the hinged bolt is already possible, since the shaft of the hinged bolt and a portion of the ball element are disposed in the second conical region of the recess. In principle, it is irrespective whether the central point of rotation of the mount lies within the component plane of the plate-shaped component or whether the central point of rotation lies somewhat outside the component plane. However, since a lever arm of the central point of rotation relative to the central plane of the plate-shaped component follows from the offset arrangement of the central point of rotation, this arrangement produces differential moments. In order to rule out these differential moments, it is therefore advantageous to adapt the elastic properties of the two spring elements on opposite sides of the ball elements to one another in such a manner that, in the nonloaded state of the mount, the central point of the ball element comes to lie substantially in a central plane between the surfaces of the plate-shaped components.

The spring elements which are used should have a shape substantially complementary to the region of the recess in which they are fitted, in order to allow for seating of the spring elements and ball element which is as clearance-free as possible. In addition, the spring element which is arranged in the conical region of the recess of the socket element should comprise a conical recess, which can be penetrated by the shaft of the hinged bolt and which tapers towards the side of the ball element. This results in a spring element whose conical outer side rests in the recess of the socket element and can be penetrated by the shaft of the hinged bolt in a conical recess, so that the hinged bolt has a maximum possible pivot range.

In order to allow for maximum cost-effective manufacture and assembly of the mount, the socket element should preferably be formed by at least two partial socket elements. In this respect, the partial socket elements are to be constructed in such a manner that they can be secured with their facing radial surfaces against one another, enclosing the ball element and the spring elements. Whether a releasable manner of securing is used, such as screwing together the two partial socket elements, or nonreleasable securing, such as bonding or welding of the two partial socket elements, depends upon the respective application. The two partial socket elements can be connected to one another with particular precision by friction welding.

One possibility of designing the two partial socket elements is to arrange the cylindrical region of the recess for receiving the ball element in the first socket element and the conical region of the recess for receiving the ball element in the second socket element. This design allows for the construction of a mechanical assembly system for mounts for securing plate-shaped components having different plate thicknesses. The partial socket element in which the conical region of the recess for receiving the ball element is arranged is used in the same manner for all plate thicknesses. The dimensional compensation is effected by varying the length of the partial socket element which comprises the cylindrical region of the recess for receiving the ball element, since this can be easily manufactured in different lengths. Consequently, the number of parts which need to be manufactured is reduced. During construction, it is then necessary to use a longer spring element which corresponds to the length of the partial socket element.

The socket element can be manufactured in a particularly cost-effective manner if the first partial socket element acts as the basic part of the socket element and comprises both the cylindrical and the conical regions of the recess for receiving the ball element. The second partial socket element can then be constructed as a simple cover, more particularly in the manner of a perforated disk, through which the shaft of the hinged bolt can engage. This cover can be secured to the end of the first partial socket element pointing towards the shaft of the hinged bolt, thereby enclosing the ball element and the spring element.

In order to secure the mount to the plate-shaped component in a manner known per se, the first partial socket element should preferably comprise, at its end pointing away from the hinged bolt, a flange-like circumferential or conically bevelled peripheral region, which can be brought to rest indirectly or directly against the plate-shaped component. Between the socket element and the recess in the plate-shaped component, it is possible to arrange metallic or rubber-elastic sleeves, for example, in order to allow for dimensional compensation. In order to secure the socket element in the recess of the plate-shaped component in a clamping manner, the socket element should comprise, in a manner known per se and at least in certain regions, an external thread, onto which a securing ring can be screwed in such a manner that the plate shaped component can be indirectly or directly clamped between the flange-like circumferential or conically bevelled peripheral region of the first partial socket element and the securing ring.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

Figure 5:
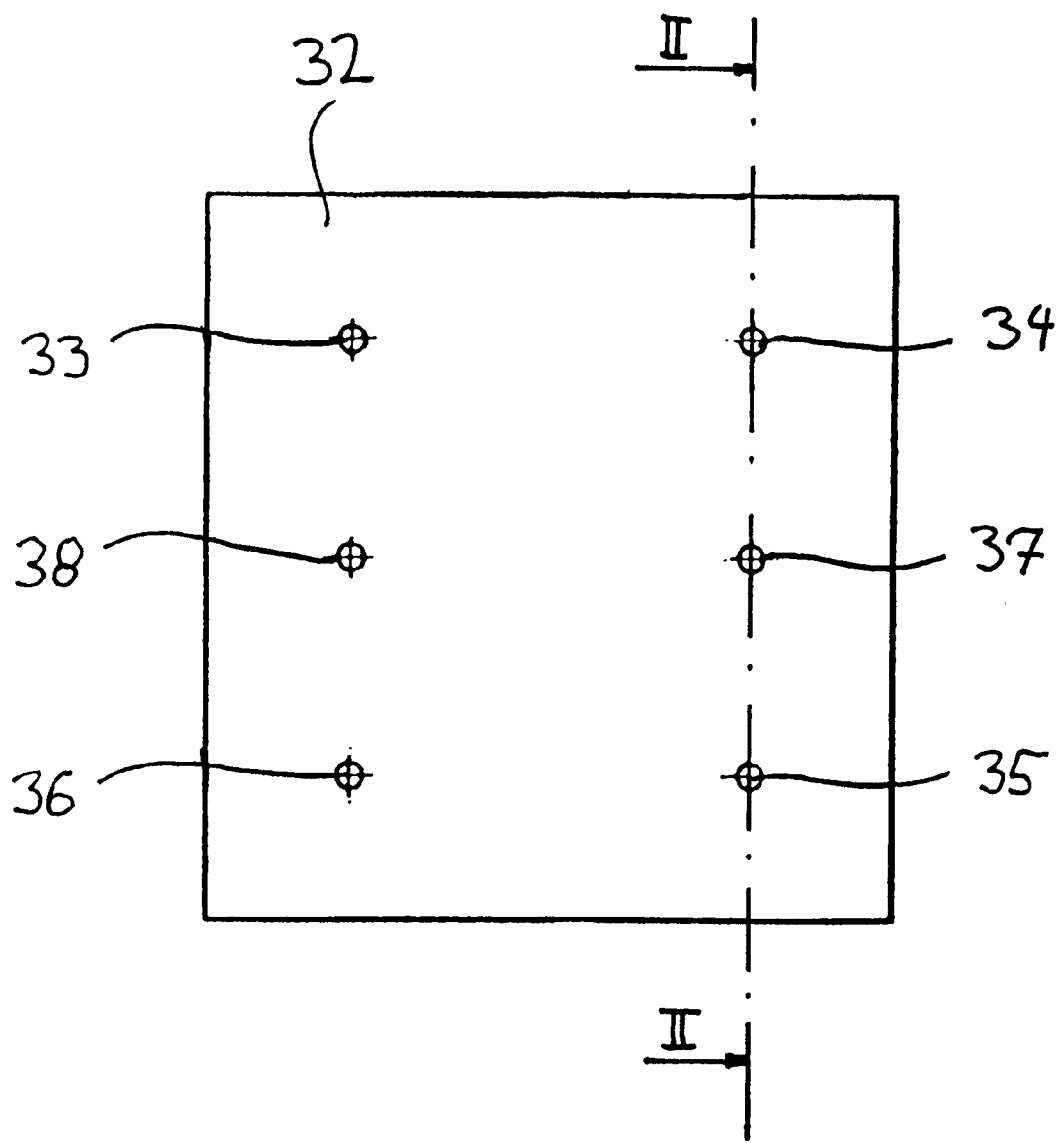
Figure 6:
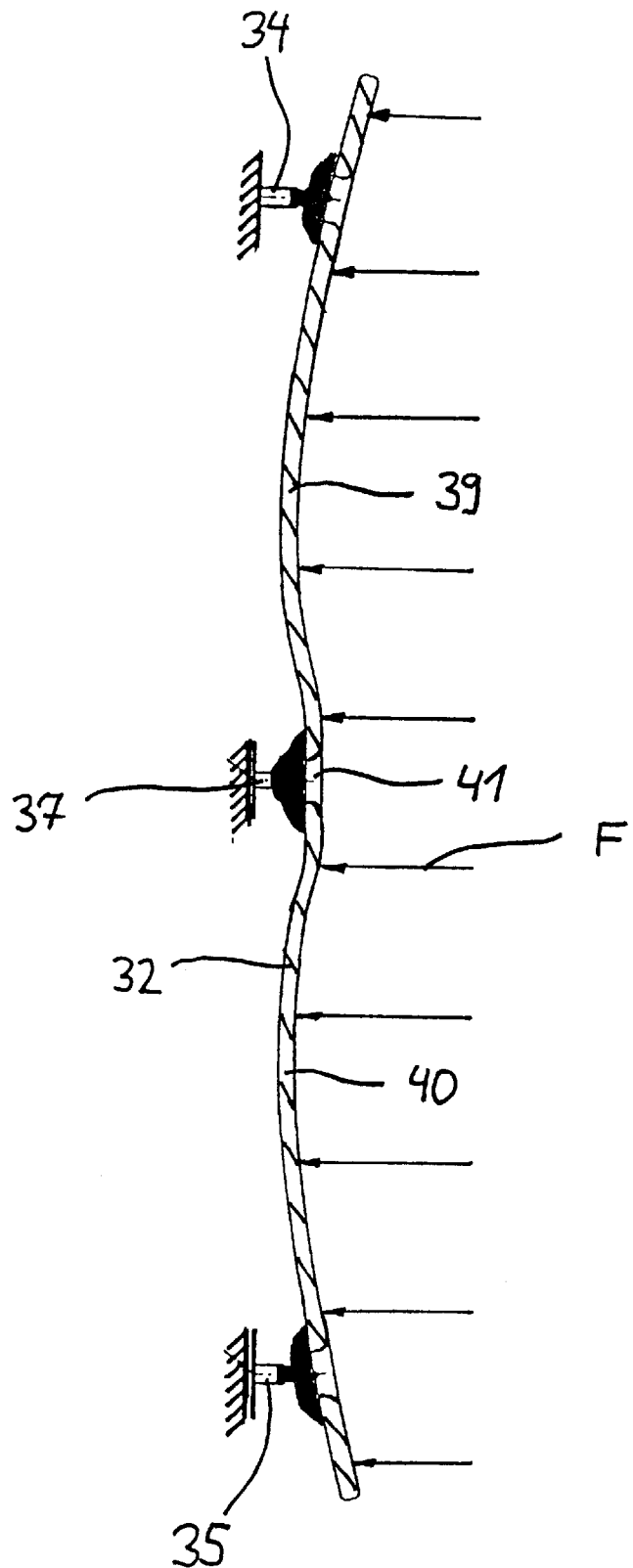

FIG: 5 is a top view of a second embodiment of a plate-shaped component with mount;

FIG. 6 is a lateral cross sectional view through the embodiment from FIG. 5.

DESCRIPTION OF THE PREFERRED EMBODIMENTS

Figure 1:
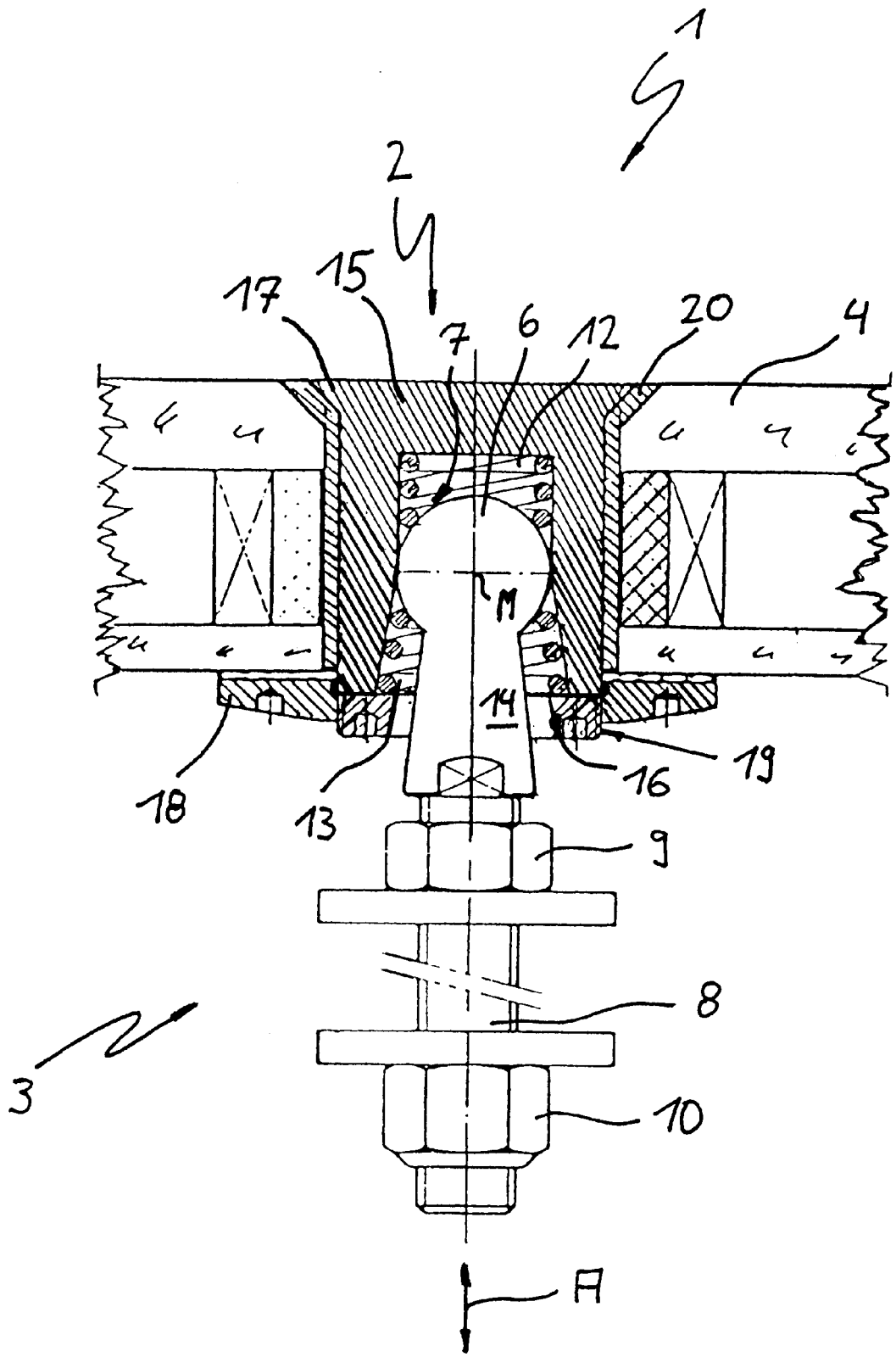
FIG. 1 is a schematic longitudinal sectional view through a first embodiment of a mount.

Referring to the drawings in particular, in FIG. 1, a mount 1 is illustrated with a socket element 2 and a hinged bolt 3. The socket element 2 penetrates a recess in a plate-shaped component 4, which is designed in the manner of a sandwich structure. The first end of the hinged bolt 3 is constructed as a ball element 6, which is pivotably mounted in a recess 7 of the socket element. The second end of the hinged bolt 3 is constructed in the form of a threaded rod 8 and can be fixed by means of nuts 9 and 10 to a support structure, not shown. The recess 7 of the socket element 2 is constructed in such a manner that the hinged bolt 3 can be linearly displaced along its longitudinal axis in the direction of the movement arrow A.

Arranged between the axial boundaries of the recess 7 and the opposite sides of the ball element 6 are the spring elements 12 and 13 respectively, which are constructed as helical springs. The two helical springs 12 and 13 are fitted in a prestressed state and ensure that the ball element 6 is held in the non-loaded state of the mount 1 with a certain degree of clearance between the two axial ends of the recess 7. The two helical springs 12 and 13 rest directly against the ball element 6 and the required hinge function is supplied by the annular structure of the two axial ends of the helical springs 12 and 13. The helical spring 12 is arranged in the cylindrical region of the recess 7 and the helical spring 13 in the conical region of the recess 7. The conical and cylindrical regions of the recess 7 extend into one another in the radial plane in which the central point M comes to lie in the non-loaded state of the mount 1. The recess of the helical spring 13, which is penetrated by the hinged bolt 3, also has a conical shape so as not to impede the pivoting movement of the hinged bolt 3 in the region 14 of the hinged bolt.

The socket element 2 is composed of the partial socket elements 15 and 16. In this respect, the partial socket element 15 represents the basic element which penetrates the recess in the plate-shaped component 4 and in which both the conical and cylindrical regions of the recess 7 are arranged. The partial socket element 16 seals off the recess 7, enclosing the spring elements 12 and 13 and the ball element 6. For the passage of the hinged bolt 3, the conically tapering recess 17 is machined into the cover- like socket element 16.

The plate-shaped component 4 is fixed in a clamping fashion between the bevelled peripheral region 17 of the first partial socket element and the securing ring 18 by screwing the securing ring 18 onto the thread 19. To provide damping and dimensional compensation, the sleeve 20 is arranged between the socket element 2 and the recess of the plate-shaped component 4.

Figure 2:
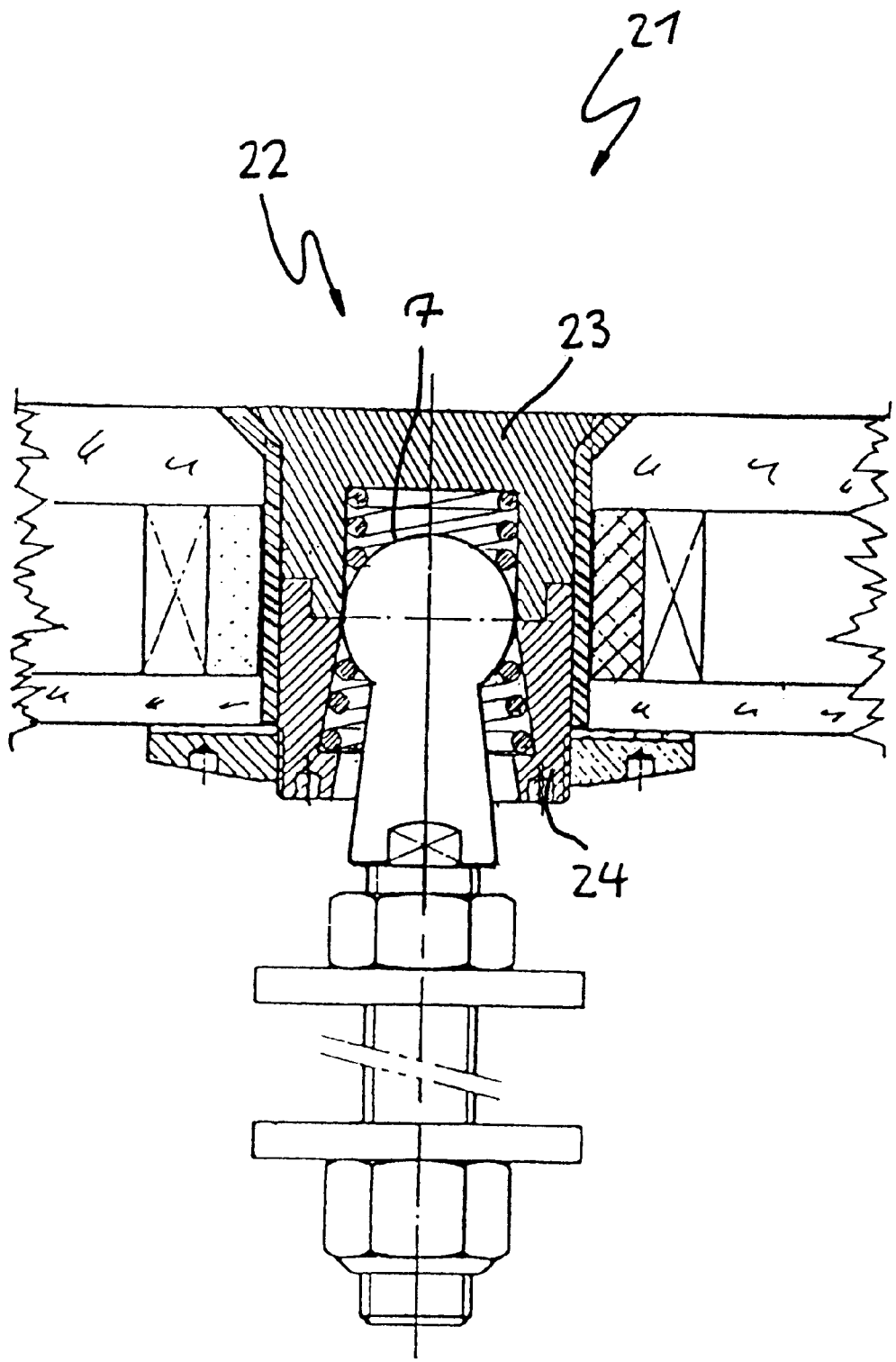
FIG. 2 is a schematic longitudinal sectional view through a second embodiment of a mount.

FIG. 2 shows the mount 21, whose method of operation corresponds to that of the mount 1 of FIG. 1. In this case, the socket element 22 is composed of the partial socket elements 23 and 24, the partial socket element 23 comprising the cylindrical a region of the recess 7 and the socket element 24 comprising the conical region of the recess 7.

Figure 3:
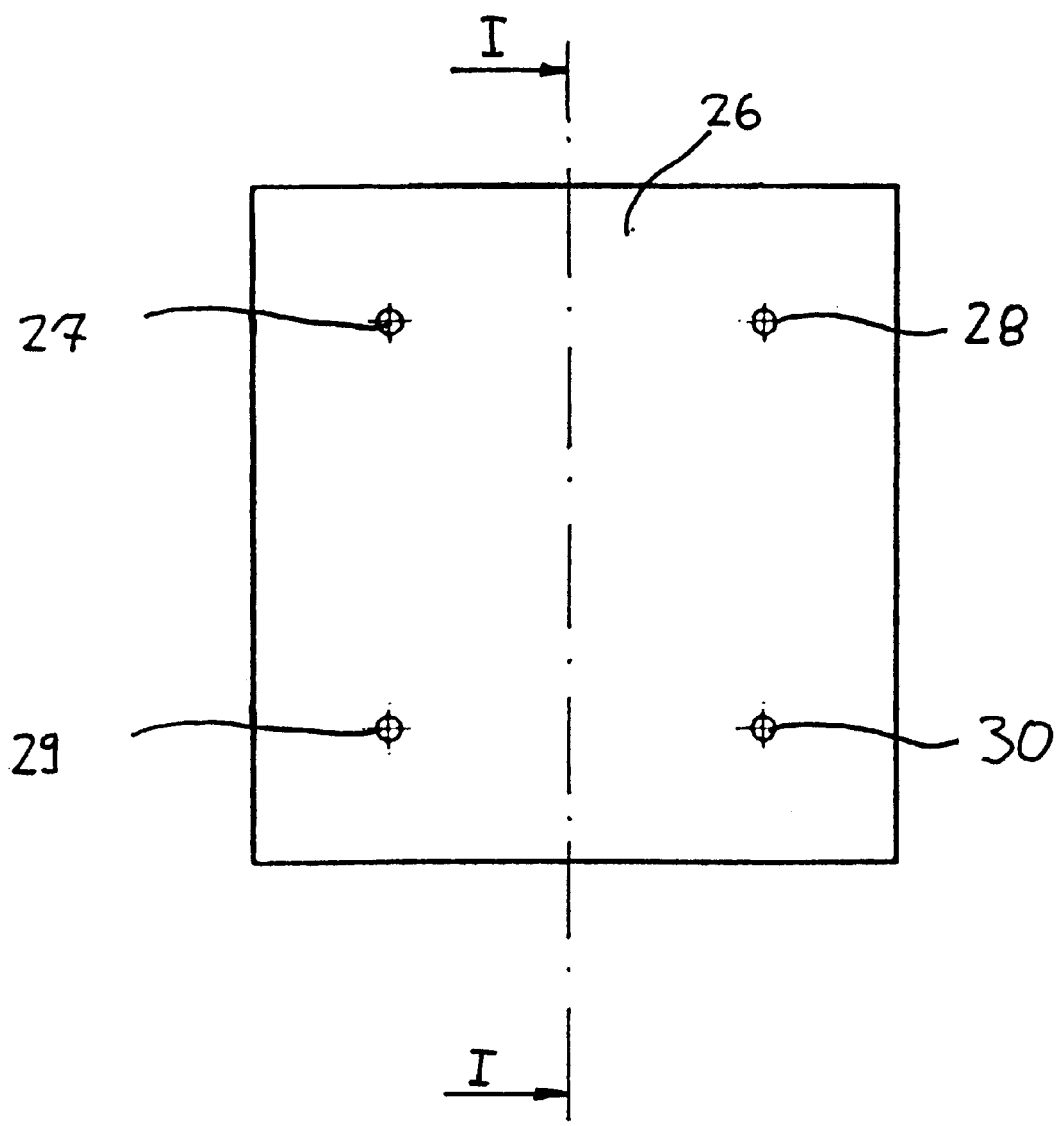
FIG. 3 is a top view of a first embodiment of a plate-shaped component with mount.

FIGS. 3, 4, 5 and 6 show the different methods of operation of conventional mounts and mounts which can be displaced according to the invention along the longitudinal axis of the hinged bolts. FIG. 3 shows a plate-shaped component 26, which can be secured to a support structure in the securing points 27, 28, 29 and 30. The securing points 27 to 30 are arranged substantially in the corner points of the plate 26.

Figure 4:
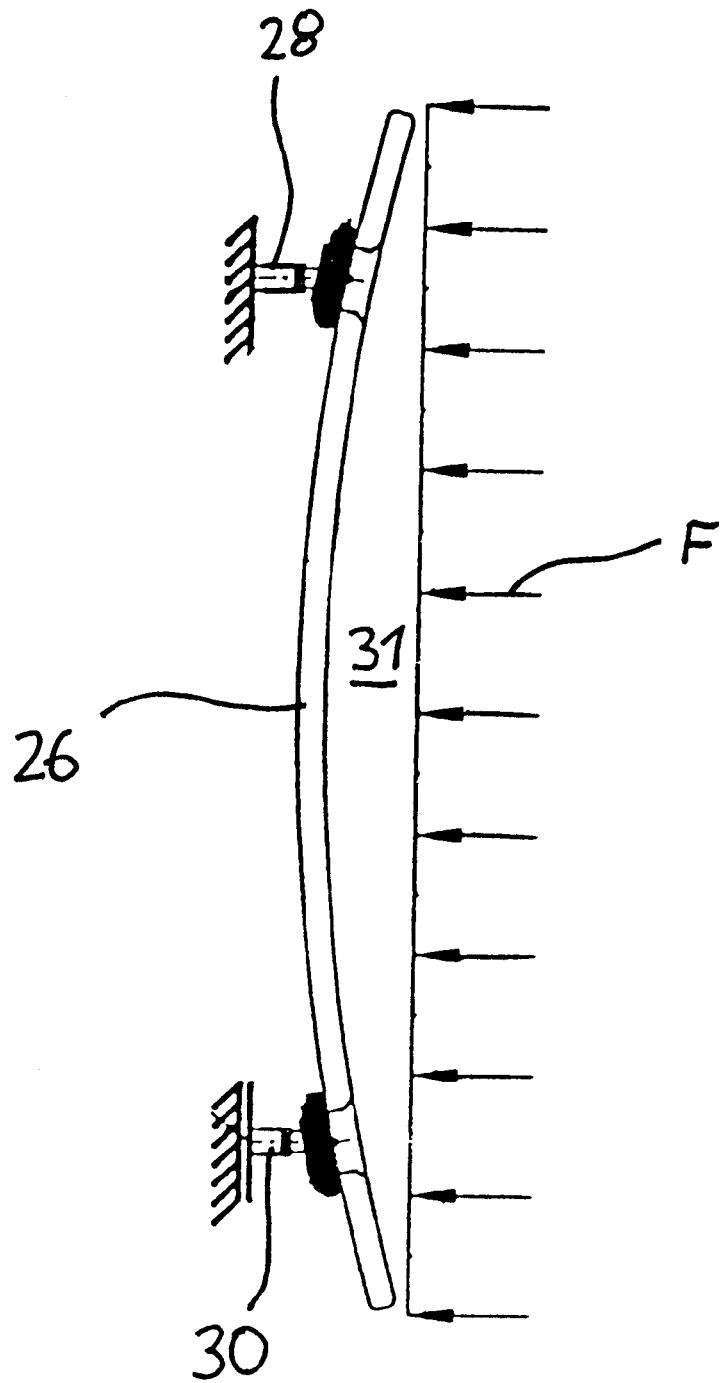
FIG. 4 is a lateral cross sectional view through the embodiment from FIG. 3.

FIG. 4 is a lateral section through the plate 26 taken along the line of section I—I. It the surface load F acts upon the plate 26, for example caused by a gust of wind, then the plate 26 buckles under this load and forms a buckled region 31. The mounts 28 and 30 allow for a pivoting movement of the plate material in the securing points. Consequently, with this type of arrangement a uniform stress path is generated in the plate material upon loading.

If larger or heavier plate-shaped components are to be secured, then it is no longer sufficient in many cases to arrange securing points solely in the corners of the component. Thus, the plate 32 shown in FIG. 5 comprises, in addition to the securing points 33, 34, 35 and 36, which are arranged in the corners of the plate 32, additional securing points 37 and 38, which are arranged between the corner points.

FIG. 6 is a lateral section through the plate 32 taken along the line of section II—II. If the plate 32 is loaded by the surface load F, then the plate 32 also buckles. However, given that the securing points are not only arranged in the corner points, two buckled regions 39 and 40 are formed. In the transition region 41, which forms along the connecting line between the securing points 37 and 38, high peak stresses would build up in the plate material if a stress-reducing deformation of the material were not permitted.

If plate-shaped components are to be fitted in a configuration essentially comparable to that of FIGS. 5 and 6, then the peak stresses can be reduced by fitting the mounts 33, 34, 35, 36, 37 and 38 according to the invention. Since the mounts 33, 34, 35, 36, 37 and 38 are linearly displaceable in the securing points along the longitudinal axis of the hinged bolts, a stress-reducing deformation of the plates 32 is enabled. The mounts 33 and 34 move as a result of a linear displacement in the direction of the surface load F and the mounts 35, 36, 37 and 38 move in the opposite direction. This displacement of the securing points results in a weaker bending deformation of the plate 32 in the transition region 41.

While specific embodiments of the invention have been shown and described in detail to illustrate the application of the principles of the invention, it will be understood that the invention may be embodied otherwise without departing from such principles.

What is claimed is:

1. A mount to a support structure, the mount comprising:
   a plate shaped component defining a plate recess;
   a socket element, which penetrates said plate recess in said plate-shaped component, said socket element having a socket recess;
   a hinged bolt with a first end having a ball element, said ball element being rotatably mounted in said socket recess, and with an opposite second end to be secured to the support structure, said ball element being at least slightly displaceable in said socket recess of said socket element along a longitudinal is of said hinged bolt; and
   at least one spring element acting indirectly or directly upon said ball element, wherein said socket recess comprises at least two rotationally symmetrical regions, whose axis or rotation extends substantially along said longitudinal axis of said hinged bolt, said first region receiving said ball element and comprising a circular cylindrical curved surface and said second region being penetrated by a shaft of said hinged bolt and comprising a conical curved surface, which tapers on a side of said socket element in a direction toward said first region.

2. The mount according to claim 1, wherein two spring elements on opposite sides of the ball element act indirectly or directly upon the ball element in said socket recess.

3. The mount according to claim 2, wherein said spring elements act directly upon said ball element, and sides of said spring elements which come to rest against said ball element are constructed with a shape or function complementing a shape of said ball element.

4. The mount according to claim 1, wherein said spring element acts directly upon said ball element, and portions of said spring element come to rest against said ball element have a shape complementing a shape of said ball element.

5. The mount according to claim 2, wherein said spring elements are constructed as helical springs.

6. The mount according to claim 1, wherein said spring element is constructed as a helical spring.

7. The mount according to claim 1, wherein two spring elements on opposite sides of the ball element act indirectly or directly upon said ball element in said socket recess and wherein one of said spring elements is arranged in each of said two rotationally symmetrical regions of said socket recess and acts indirectly or directly upon said ball element.

8. The mount according to claim 7, wherein elastic properties of said two spring elements on said opposite sides of said ball element are adapted to one another in such a manner that, in a non-loaded state of the mount, a central point of the ball element comes to lie substantially in a radial plane where the cylindrical and conical regions of said socket recess join one another in said socket element.

9. A mount to a support structure, the mount comprising:
   a plate shaped component defining a plate recess;
   a socket element, which penetrates said plate recess in said plate-shaped component, said socket element having a socket recess;
   a hinged bolt with a first end having a ball element said ball element, being rotatably mounted in said socket recess, and with an opposite second end to be secured to the support structure, said ball element being at least slightly linearly displaceable in said socket recess of said socket element along a longitudinal axis of said hinged bolt; and at least one spring element acting indirectly or directly upon said ball element, wherein two s elements on opposite sides oft ball element act indirectly or directly upon the ball element in said socket recess, wherein elastic properties of said two spring elements on the opposite sides of said ball element are adapted to one another in such a manner that, in a non-loaded state of the mount, a central point of said ball element comes to lie substantially in a central plane between surfaces of said plate-shaped component.

10. The mount according to claim 7, wherein said spring element which is arranged in said conical region of the socket defines a conical recess, which can be penetrated by a shaft of said hinged bolt and tapers towards said side of said ball element.

11. The mount according to claim 1, wherein said socket element comprises at least two partial socket elements having facing radial surfaces for securing said two partial socket elements to one another enclosing said ball element and said spring element.

12. The mount according to claim 2, wherein said socket element comprises at least two partial socket elements having facing radial surfaces for securing said two partial socket elements to one another enclosing said ball element and said spring elements.

13. The mount according to claim 11, wherein a cylindrical region of said socket recess for receiving the ball element is arranged in said first partial socket element and a conical region of the recess for receiving said ball element is arranged in said second partial socket element.

14. The mount according claims 11, wherein a cylindrical region of said socket recess for receiving said ball element is arranged in said first partial socket element and a conical region for receiving said ball element is arranged in said first partial socket element and said second partial socket element is constructed substantially as a cover, which can be penetrated by a shaft of said hinged bolt and can be secured to an end of said first partial socket element pointing towards said shaft of said hinged bolt, enclosing said ball element and said spring element.

15. The mount according to claim 11, wherein said first partial socket element at an end facing away from said hinged bolt, comprises a flange-like circumferential or conically bevelled peripheral region which can be brought to rest indirectly or directly against the plate-shaped component.

16. A mount to a support structure, the mount comprising:

a plate shaped component defining a plate recess;

a socket element, which penetrates said plate recess in said plate-shaped component, said socket element having a socket recess;

a hinged bolt with a first end having a ball element, said ball element being rotatably mounted in said socket recess, and with an opposite second end to be secured to the support structure, said ball element being at least slightly linearly displaceable in said socket recess of said socket element along a longitudinal axis of said hinged bolt; and at least one spring element acting indirectly or directly upon said ball element, wherein said socket element comprises at least two partial socket elements having facing radial surfaces for securing said two partial socket elements to one another enclosing said ball element and said spring element, wherein said socket element comprises an external thread, onto which a ring is screwed in much a manner that the plate-shaped component is indirectly or directly clamped between flange-like circumferential or conically bevelled peripheral regions of said first partial socket element and said securing ring.

17. A mount arrangement comprising:

a plate shaped component defining a plate recess;

a socket element disposed in said plate recess, said socket element defining a socket recess;

a hinged bolt with a first end having a ball element and with an opposite second end securable to a support structure, said ball element being rotatably mounted in said socket recess, said ball element being linearly displaceable in said socket recess along a longitudinal axis of said socket element;

a spring element biasing said ball element into a predetermined position with respect to said plate shaped component;

a plurality of said plate recesses defined in said plate shaped component;

a plurality of said socket elements disposed in said plurality of plate recesses; and a plurality of said hinged bolts with a corresponding plurality of said spring elements mounted in said plurality of socket elements.

18. A mount to a support structure, the mount comprising:

a plate shaped component defining a plate recess;

a socket element, which penetrates said plate recess in said plate-shaped component, said socket element having a socket recess;

a hinged bolt with a first end having a ball element, said ball element being rotatably mounted in said socket recess, and with an opposite end to be secured to the support structure, said ball element being at least slightly linearly displaceable in said socket recess of said socket element along a longitudinal axis of said hinged bolts;

at least one spring element acting indirectly or directly upon said ball element;

a plurality of said plate recesses defined in said plate shaped component;

a plurality of said socket elements disposed in said plurality of plate recesses; and a plurality of said hinged bolts with a corresponding plurality of said spring elements mounted in said plurality of socket elements.

* * * * *

UNITED STATES PATENT AND TRADEMARK OFFICE
CERTIFICATE OF CORRECTION

PATENT NO.    : 6,227,751 B1
DATED         : May 8, 2001
INVENTOR(S)   : Kemmer et al.

It is certified that error appears in the above-identified patent and that said Letters Patent is hereby corrected as shown below:

<u>Title page,</u>
Item [73], should read as follows"
-- (73)   Assignee: Mero Systeme GmbH & Co. KG,
                    Würzburg (DE)

Signed and Sealed this

Eleventh Day of June, 2002

Attest:

Attesting Officer

JAMES E. ROGAN
Director of the United States Patent and Trademark Office